DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED JANUARY 1, 1974

918 O.G. 105

T918,009

METHOD FOR PRODUCING A HIGH STRETCH TEXTURED POLYESTER YARN FOR PACKAGE DYEING

Robert G. Wrye, Rte. 14, 4503 Grace Drive 37664, and Giuliano Gambino, 685 Sherman Place 37660, both of Kingsport, Tenn.

Filed July 30, 1973, Ser. No. 383,762

**Int. Cl. D02g *1/02***

U.S. Cl. 57—157 TS

No Drawing. 8 Pages Specification

A method for producing a high stretch multifilament textured yarn of the torque stretch type, the textured yarn retaining skein shrinkages after package dyeing of 20% to 35%. The method includes the steps of feeding the multfilament yarn from a supply source to a false twist device, false twisting the yarn, heat setting the false twisted yarn in a heating zone, removing the false twist after heat setting and feeding the yarn to a take-up package. The improvement comprises overfeeding the multifilament yarn to the take-up package at about 30 to 60 percent. Thereafter, the take-up package may be package dyed under pressure at about 250° to 265° F. to retain such high skein shrinkages. One embodiment of the invention involves the use of a single heater, the multifilament yarn being overfed to the take-up package at about 50 to 60 percent. After package dyeing the take-up package retains 30 to 35 percent skein shrinkage. A second embodiment of the invention involves the use of a second heater, the multifilament yarn being overfed to the second heater by about 40 percent, the yarn being heatset in this second heating zone and then fed to the take-up package. After package dyeing the take-up packages have skein shrinkages of about 20 to 25 percent.